(No Model.)

O. B. SHALLENBERGER.
COUPLING DYNAMO ELECTRIC MACHINES FOR ELECTRIC DISTRIBUTION.

No. 390,910. Patented Oct. 9, 1888.

Witnesses.
Geo. W. Breck.
Carrie E. Ashley.

Inventor,
Oliver B. Shallenberger,
By his Attorneys
Pope & Edgecomb

UNITED STATES PATENT OFFICE.

OLIVER B. SHALLENBERGER, OF ROCHESTER, ASSIGNOR TO GEORGE WESTINGHOUSE, JR., OF PITTSBURG, PENNSYLVANIA.

COUPLING DYNAMO-ELECTRIC MACHINES FOR ELECTRIC DISTRIBUTION.

SPECIFICATION forming part of Letters Patent No. 390,910, dated October 9, 1888.

Application filed October 12, 1886. Serial No. 215,994. (No model.)

*To all whom it may concern:*

Be it known that I, OLIVER B. SHALLENBERGER, a citizen of the United States, residing in Rochester, in the county of Beaver and State of Pennsylvania, have invented certain new and useful Improvements in Systems of Exciting and Regulating Alternate-Current Electric Generators, of which the following is a specification.

The invention relates especially to the method of maintaining the field of force of an alternate-current electric generator by currents derived from the generator itself; and it consists, in general terms, in regulating and controlling the currents by first producing secondary or induced currents from the primary or generated currents by means of electric converters and then causing such induced currents to be converted into the continuous current, which is caused to traverse field-magnet coils, and introducing a greater or less length of the converter-coils in circuit and employing adjustable resistances in the secondary circuits. The rectified currents may be employed for exciting the field-magnet of another generator.

No claim is here made to the broad idea of exciting the field-magnet of an alternate-current generator by rectified induced currents which are derived from the generator through an induction-coil or converter.

Figure 2:
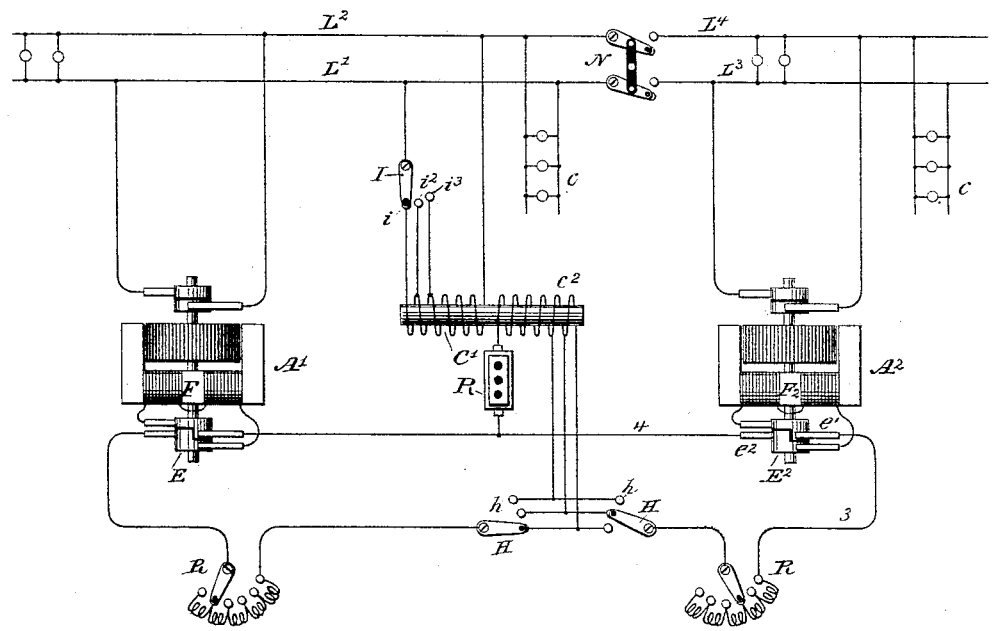
Figure 1:
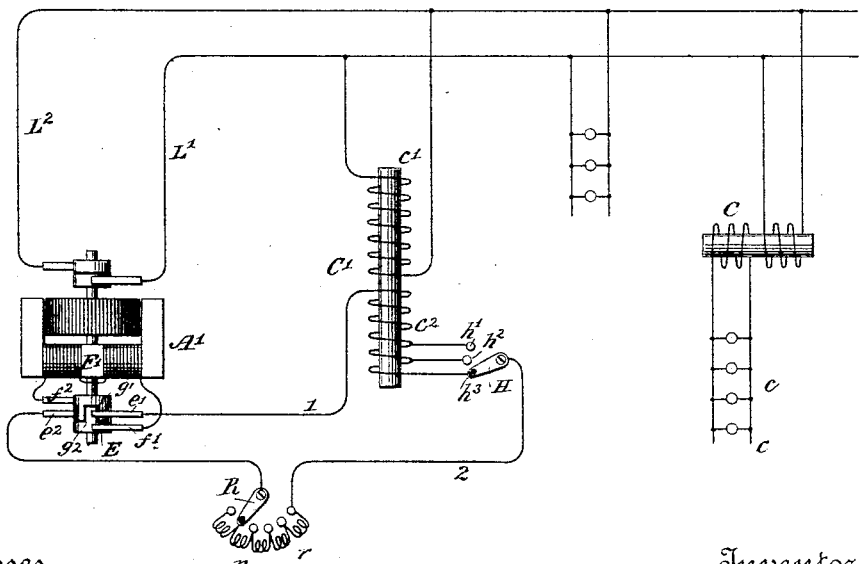

In the accompanying drawings, Figure 1 is a diagram illustrating the organization of the apparatus. Fig. 2 illustrates a method of supplying the field-magnet coils of more than one generator.

Referring to Fig. 1, A' represents an alternate-current generator of any suitable character. The currents from the generator are transmitted upon conductors L' and L², and are designed to be employed for operating any suitable forms of translating devices—such, for instance, as incandescing electric lights. At $c\,c$ there are shown such devices connected in the secondary circuit of an induction-coil or converter, C. The currents required for maintaining the field of force for the generator are derived from a converter, C', the primary coil $c'$ of which is connected in multiple-arc circuit, or, it may be, in series with the main lines L' and L². The secondary circuit or coil $c^2$ has one terminal connected with a conductor, 1, leading to a contact-brush, $e'$, applied to a commutator, E, mounted upon a shaft of the generator. A second brush, $e^2$, is connected through a conductor, 2, with the remaining terminal of the coil $c^2$. Two contact-brushes, $f'\,f^2$, are respectively connected with the terminals of the field-magnet coil F' of the generator. It is designed that the alternating currents which will be induced in the secondary coil shall be transformed into a continuous current by the commutator E, and thus traverse the coils F' in a constant direction. For this purpose the commutator is made with alternating conducting-surfaces $g'\,g^2$, against which the brushes rest. The brushes $f'\,f^2$ are at all times in contact, respectively, with the plates $g'\,g^2$, while the brushes $e'\,e^2$ make alternate connection with the plates with the same frequency as the changes in the direction of the current induced in the secondary coil.

The commutator may, it is evident, be constructed upon any well-known principle. Usually it will be desired to make several changes in direction of current each revolution, and in any case the number of changes produced by the commutator should equal the number of alternations per revolution.

The object of introducing the converter is, first, to change the electro-motive force of the exciting-current from that of the primary to a more suitable value—usually a lower electro-motive force—before it is sent through the coils of the field-magnet, and, second, to provide means for varying the difference of potential at the terminals of the field-magnet coils, in order to vary the strength of the field without necessarily introducing resistances into the circuit. This latter object may be accomplished by leading conductors from different points in the length of secondary coil to contact-points $h'\,h^2\,h^3$ of a switch, H. The switch H is connected with the conductor 2. By varying the amount of active wire in the secondary coil the electro-motive force may be increased or decreased in direct proportion. Another way of accomplishing the result is to introduce more or less of an adjustable artificial resistance, $r\,r$, by means of the switch R', this switch and resistance being placed in the length of the conductor 2.

In Fig. 2 there is shown a method of exciting two or more generators by currents derived from the work-circuit L' L². In this instance two generators, A' A², are shown. The former of these is connected with the main lines L' L², as before, and it has its field maintained by currents derived from the secondary coils of the converter C', the primary coils of which are included between the two lines L' L². The second generator, A², also has its field-magnet coils F supplied from the secondary coils of the converter C', one terminal of this coil being connected by the conductor 3 with the brush e', while the other terminal is connected by the conductor 4 with the brush e² of the commutator E². The amount of the secondary wire included in circuit may be made adjustable by a switch, H, and contact-points h h, as before, and likewise adjustable resistances R R may be included in circuit. By means of the switches H H the amount of active secondary wire included in circuit with the field-magnets of the two generators may be varied independently of each other, and one may be made to deliver currents of different potential from the other.

It may sometimes be desired to vary the amount of the primary coil which is in circuit, and this may be done by leading conductors from different points in its length to contact-points i' i² i³, and connecting the main line L' with a corresponding switch, I. When the amount of wire in the primary coil is varied, the induced current is varied inversely.

The work-circuit of the second generator, A², is shown independent of the circuit of the generator A'; but the two may be combined by suitable switch, N, adapted to place lines L' and L³ in connection with each other, and likewise the lines L² and L⁴.

An adjustable resistance, R, may be inserted in the circuit of the secondary coil c² of the converter C' in Fig. 2. This is employed for varying all the fields in circuit with the converter. This resistance would have the same effect as changing the resistance in the field of the exciter in a separately-excited machine.

I claim as my invention—

1. The combination, substantially as hereinbefore set forth, of an alternate-current generator, an electric converter having its primary coils connected with the armature of the generator and its secondary coils connected through the field magnet coils of the generator, a commutating device included in the circuit of the secondary coils, and a switch for including more or less of the coils of the secondary in circuit, substantially as described.

2. The combination, substantially as hereinbefore set forth, of an alternate-current generator, an electric converter having its primary coils connected with the armature of the generator and its secondary coils connected through the field-magnet coils of the generator, a commutating device included in the circuit of the secondary coil, and an adjustable artificial resistance in the circuit of the secondary coil.

3. The combination, substantially as hereinbefore set forth, of an alternate-current generator, an induction-coil or converter supplied therefrom, conductors leading from the secondary coil of the converter to the field-magnet coils of the generator, a commutator for rendering the current thus supplied to the field-magnet coil continuous, and a second alternate-current generator having its field-magnet coils also included in the secondary circuit of said induction-coil, whereby the excitations of the two generators are interdependent.

4. The combination, with two alternate current generators and an induction-coil or converter, of conductors leading from the secondary coil of the converter through the field-magnet coils of said generators, commutating devices for rendering continuous the current thus supplied to the field-magnet coils, and switch devices for connecting different numbers of convolutions or lengths of the secondary coil in circuit with the field-magnet coils, substantially as described.

5. The combination, substantially as hereinbefore set forth, of an alternate-current generator, an induction-coil or converter supplied therefrom, conductors leading from the secondary coil of the converter to the field-magnet coils of the generator, a commutator for rendering the current thus supplied to the field-magnet coil continuous, a second alternate-current generator having its field-magnet coils also included in the secondary circuit of said induction coil, and means for varying the current supplied from the secondary coil of the converter to the field magnet coils of both generators.

6. The combination of an alternate-current electric generator, an induction-coil or converter having its primary coil included in the circuit of said generator, a second generator, a commutator connected with the secondary coil of the converter, and conductors leading therefrom to the field-magnet coils of the second generator, whereby the excitation of the second generator is governed by the first.

7. The combination of a source of alternating electric currents, an induction-coil or converter having its primary coil included in the circuit of said source, an electric generator, a commutator connected with the secondary coil of said converter, and conductors leading therefrom to the field-magnet coils of the said generator, whereby the excitation of the generator is dependent upon current received from the said source.

In testimony whereof I have hereunto subscribed my name this 28th day of September, A. D. 1886.

OLIVER B. SHALLENBERGER.

Witnesses:
ALBERT L. REINMANN,
W. B. CORWIN.